United States Patent [19]

Kaji et al.

[11] Patent Number: 4,754,323
[45] Date of Patent: Jun. 28, 1988

[54] COLOR IMAGE PICKUP DEVICE IN WHICH THE LEVEL OF A SEQUENTIAL COLOR-DIFFERENCE SIGNAL IS CONTROLLED ON THE BASIS OF THE LEVEL OF THE LUMINANCE SIGNAL

[75] Inventors: Toshio Kaji; Seiji Hashimoto, both of Yokohama; Tokuzo Kato, Ichikawa; Tsutomu Takayama, Kawasaki, all of Japan

[73] Assignee: Canon Kabushiki Kaisha, Tokyo, Japan

[21] Appl. No.: 14,178

[22] Filed: Feb. 11, 1987

Related U.S. Application Data

[63] Continuation of Ser. No. 564,764, Dec. 22, 1983, abandoned.

[30] Foreign Application Priority Data

Dec. 29, 1982 [JP] Japan ................... 57-231536

[51] Int. Cl.[4] .................... H04N 9/077; H04N 9/04; H04N 9/68; H04N 9/73
[52] U.S. Cl. .................... 358/44; 358/27; 358/29; 358/41; 358/316
[58] Field of Search .................... 358/29, 41, 43, 44, 358/310, 316, 906, 27, 47, 50

[56] References Cited

U.S. PATENT DOCUMENTS

| | | | |
|---|---|---|---|
| 3,699,241 | 10/1972 | Larsen | 358/27 |
| 3,717,725 | 2/1973 | Numakura | 358/316 |
| 3,821,789 | 6/1974 | Durbin, Jr. et al. | 358/29 |
| 3,988,776 | 10/1976 | Shinozaki et al. | 358/41 |
| 4,338,625 | 7/1982 | Yamanaka | 358/29 |
| 4,359,756 | 11/1982 | Schneider et al. | 358/27 |
| 4,437,112 | 3/1984 | Tanaka et al. | 358/44 |
| 4,504,854 | 3/1985 | Masuda | 358/44 |

FOREIGN PATENT DOCUMENTS

| | | | |
|---|---|---|---|
| 50-17134 | 2/1975 | Japan. | |
| 52-28818 | 3/1977 | Japan | 358/316 |
| 54-105428 | 8/1979 | Japan | 358/27 |
| 56-125179 | 10/1981 | Japan | 358/27 |
| 57-80889 | 5/1982 | Japan | 358/29 |

Primary Examiner—James J. Groody
Assistant Examiner—Randall S. Svihla
Attorney, Agent, or Firm—Fitzpatrick, Cella, Harper & Scinto

[57] ABSTRACT

A color image pickup device suppresses false color signals in order to provide true color reproduction. That is, the device incrementally or continuously reduces false color signals. More particularly, this device includes a color separation filter through which an optical image passes to an image pickup device such as a CCD sensor or the like. A suppression circuit that includes a low pass filter and a high brightness detector detects when the brightness of the optical image exceeds a predetermined level. A color signal forming circuit forms a plurality of color signals from the output of the image pickup device and this plurality of color signals are output by a sequencing circuit in a predetermined cycle. The output level of the sequencing circuit is adjusted in response to the output of the detector by a control circuit, and this output is modulated by a modulator. Thus, in accordance with the present invention, the output level of the sequencing circuit is controlled in accordance with the brightness level of the optical image before modulation of the output color signal from the sequencing circuit.

31 Claims, 5 Drawing Sheets

FIG. 1 PRIOR ART

COLOR FILTER

COLOR IMAGE PICKUP DEVICE IN WHICH THE LEVEL OF A SEQUENTIAL COLOR-DIFFERENCE SIGNAL IS CONTROLLED ON THE BASIS OF THE LEVEL OF THE LUMINANCE SIGNAL

This application is a continuation of application Ser. No. 564,576 filed 12/22/83 abandoned.

FIELD OF THE INVENTION

The present invention relates to a color image pickup device for obtaining a color image signal using image pickup means and, more particularly, to a color image pickup device which can suppress a false color signal to be generated when photographing an object with high brightness. The term "suppress" as used in this specification and the concluding claims means continuous or incremental reduction, for example, of a signal.

BACKGROUND OF THE INVENTION

Conventionally, in color solid-state image pickup devices of the three-plate type, three solidstate image pickup devices for green, red and blue are used and their sensitivity characteristics are matched; therefore, even if radiation sensitive devices were saturated, no problem is caused in producing a white image.

Figure 1:
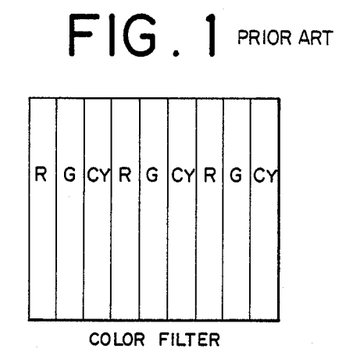
FIG. 1 is a diagram showing a color filter array in one embodiment according to the present invention.
Figure 2:
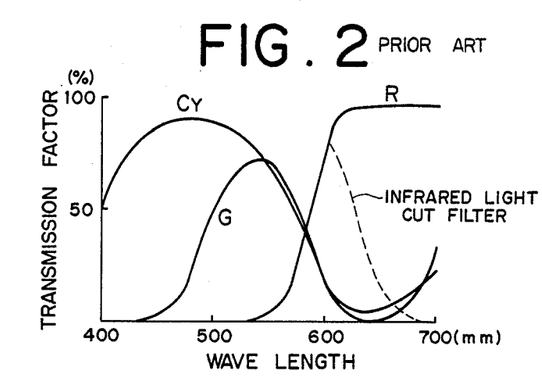
FIG. 2 is a diagram showing examples of color filter transmission factor characteristics.
Figure 3:
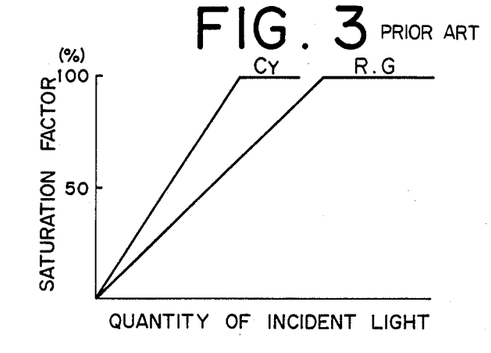
FIG. 3 is a diagram showing saturation characteristics of solid-state image pickup devices to the quantity of incident light in case of using the color filter shown in FIG. 2.

On the contrary, in color solid-state image pickup devices of the single-plate type, the sensitivity on the side of a short wavelength (blue sensitivity) of the solid-state image pickup device is generally low and this causes the picture quality to deteriorate; therefore, a method is adopted whereby a cyan (blue green) filter is used in place of a blue filter, thereby improving the resolution. However, due to a difference in transmission factor of each color filter, the quantities of incident light which saturate the radiation sensitive devices differ from one device to another, so that this causes a problem such that a false color signal is generated in photographing an object with high brightness. For example, in the case where the transmission factor of each color filter in such a color filter array as shown in FIG. 1 is as shown in FIG. 2, the saturation state of each radiation sensitive device to the quantity of incident light is such that the radiation sensitive device corresponding to the Cy (cyan) filter would have been saturated with less quantity of radiation than in the case of the radiation sensitive devices corresponding to R (red) and G (green) filters, as shown in FIG. 3. In this case, since the B (blue) signal is obtained by subtracting the G signal from the Cy signal, when the radiation sensitive device responsive to Cy is saturated, the B signal starts decreasing and when the radiation sensitive devices responsive to both Cy and G are saturated, the B signal will disappear. This results in a yellow false color signal, causing the reproduced image to be unnatural.

Figure 4:
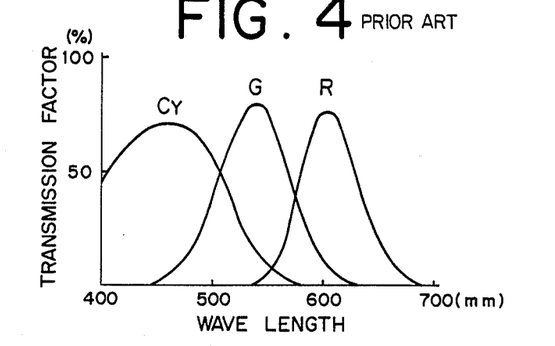
FIG. 4 is a diagram showing other examples of the color filter transmission factor characteristics.
Figure 5:
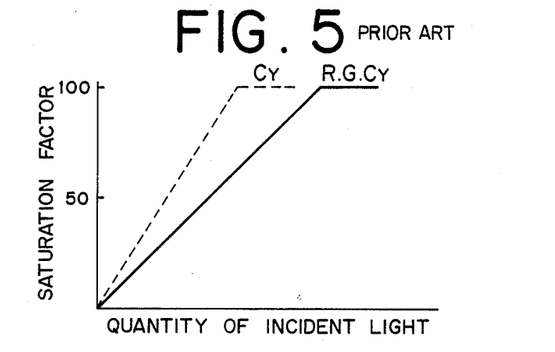
FIG. 5 is a diagram showing the saturation characteristics of the solid-state image pickup devices in case of performing color temperature correction using the color filter of FIG. 4.

In consideration of such a problem, a method has been proposed whereby as shown in FIG. 5, the transmission characteristic of the color filter is selected as shown in FIG. 4 in the manner such that the quantities of saturation light of the radiation sensitive devices corresponding to each of the R, G and Cy color filters are identical. However, even this example also has a drawback such that the quantity of saturation light of each radiation sensitive device changes with a change in color temperature, so that correct saturation light quantities cannot be obtained. Although the execution of color temperature correction or compensation for every color filter enables the occurrence of such a problem as mentioned above to be eliminated, an apparatua to realize this purpose will be complicated and expensive. To solve such a drawback, a method can be considered whereby the saturation output signal level is detected and a color carrier signal (color signal-modulated carrier signal) is suppressed by this detection signal. However, in a system with a recording apparatus built-in instead of a general video system, there may be a case where a luminance signal and a color signal are directly put in a magnetic recording circuit without passing through an NTSC encoder. In such a system, it is impossible to use the above-mentioned means for suppressing the color carrier signal by way of the saturation level detection signal as it is. In addition, if one intends to, for example, restrict the level or to cut the color subcarrier at the stage of such a color carrier signal, there is a drawback such that a range of the color signal to be suppressed will have been widened in the direction of the time base due to the function of a low-pass filter which is ordinarily included in the separation process of each color signal, and that a positional difference will be caused between the position where the brightness level exceeds a reference level and the position of the color signal to be suppressed. This results in a cause of an error signal.

Particularly, such a problem is critical in a wide-band image pickup system.

Now considering the case of performing such suppression of color signal in the color separation circuit for color separating an output of the image sensor, amplifiers and the like for suppression must be equipped for every color. This causes drawbacks such that the system configuration becomes complicated and it is difficult to easily balance the performance and characteristics of those amplifiers.

SUMMARY OF THE INVENTION

It is an object of the present invention to provide a color solid-state image pickup device which can eliminate such inconvenience in conventional technology.

Another object of the present invention is to enable the occurrence of a false signal to be prevented with a simple constitution in a system having a recording apparatus therein by providing an apparatus for eliminating inconvenience, as in a conventional example, before a color separation circuit or after a linesequence switching circuit.

Still another object of the present invention is to allow the suppressed state relating to each color to be easily balanced.

The objects are accomplished by the image pickup device comprising an image sensor combined with a color separation filter; a detector for detecting a brightness level of an object; a color signal forming circuit for forming a color signal from in output of the image sensor; a sequence circuit for sequencing the color signal; a controller for controlling the level of an output of the sequence circuit responsive to an output of the detector; and a modulator for frequency modulating an output of the controller.

Other objects and features of the present invention will be more apparent from the following description with reference to the accompanying drawings.

BRIEF DESCRIPTION OF THE PREFERRED EMBODIMENTS

The present invention will now be described in detail hereinbelow with respect to one embodiment.

Figure 6:
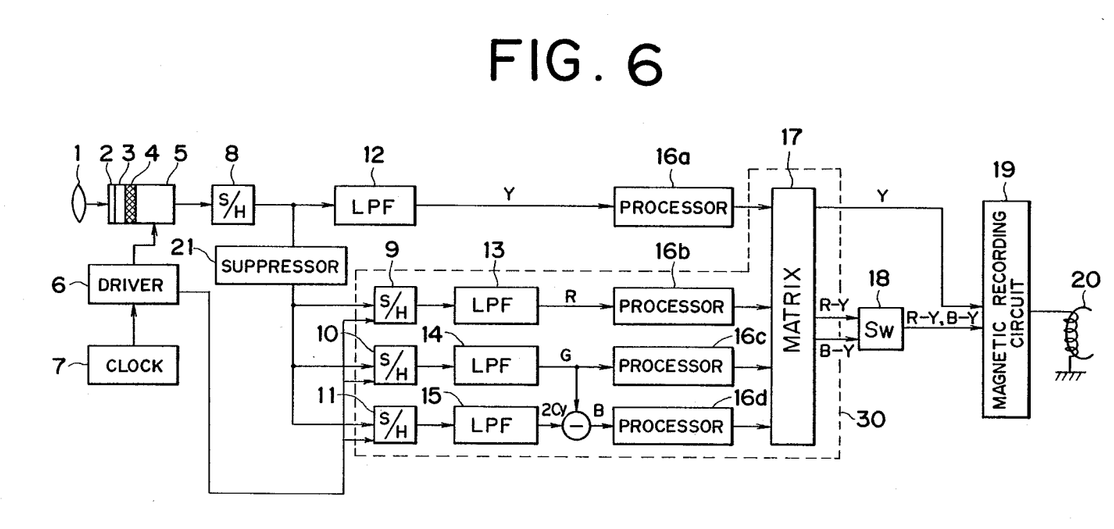
FIG. 6 is a block diagram of an embodiment according to the present invention.

FIG. 6 is a block diagram showing a first embodiment of the present invention. An optical image passed through a lens 1 is formed on the radiation sensitive surface of a CCD image sensor 5 as image pickup means through a color temperature correction filter 2, an infrared cut filter 3 and a color stripe filter 4. A CCD or MOS image sensor, or an image pickup tube may be used as the above-mentioned image pickup means. The color arrangement of the color stripe filter has a constitution, e.g., as shown is FIG. 1. After the pulse generated by a clock generator 7 was set to a predetermined level by a driver (drive circuit) 6, it is used to drive the CCD 5. An electric signal which was photoelectric converted by the CCD is read out as a dot-sequence signal and this signal passes through a sample and hold circuit 8 and then passes through a low-pass filter 12, thereby to produce a luminance signal Y. At the same time, the signal output from the sample and hold circuit 8 passes through a false color signal suppression circuit 21 as level control means according to the present invention and is input to sample and hold circuits 9, 10 and 11 and is separated into the B, G and Cy signals, respectively. After each of these signals passes through low-pass filters 13, 14 and 15, respectively, the G signal is subtracted from the Cy signal to obtain the B signal. In addition, the luminance signal Y and color signals R, G and B respectively pass through processors 16a–16d and are input to a matrix circuit 17. The color-difference signals (R-Y) and (B-Y) and the Y signal are synthesized in the matrix circuit 17. The (R-Y) and (B-Y) signals are converted into a line-sequence signal which changes over like (R-Y), (B-Y), (R-Y), . . . at every 1H (horizontal interval) by a switching circuit 18. This line-sequence signal and the abovementioned luminance signal Y are together introduced to a magnetic recording circuit section as modulation means, where they are subjected to a proper frequency modulation. Thereafter, they are written on a magnetic sheet by means of a head 20. A reference numeral 30 denotes a color signal forming block as color signal forming means according to the present invention.

Figure 7:
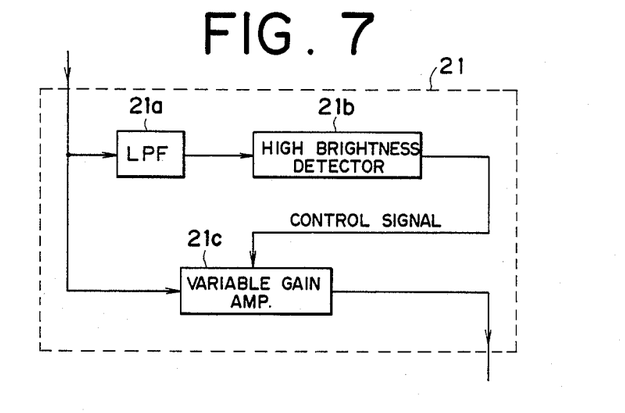
FIG. 7 is a diagram showing an example of a false color signal suppression circuit.

The operation of this circuit arrangement will now be described. If the color stripe filter has such an arrangement as shown in FIG. 1 as described previously and the transmission factor for each color is selected so as to have such a characteristic as shown in FIG. 4, outputs from the CCDs responsive to each of color filter array R, G and Cy will be 1:1:1 in case of photographing a colorless (non-chromatic) object. As for the Cy filter, the filters having the transmission factors of 1:1 with respect to G and B, respectively, are selected and the color temperature is corrected by the color temperature correction filters at 4500° and 6000° taking 3200° as a reference. That is, at the reference temperature 3200°, the outputs corresponding to the color filter arrays R, G, Cy are 1:1:1. However, at higher temperatures this relationship between the outputs changes, and correction is therefore made at 4500° and 6000° since at these temperatures the change in relationship between the outputs cannot be neglected. Although the output signal of the CCD 5 is the dot-sequence signal of R, G and Cy, it is possible to directly form the highfrequency domain components of the luminance signal Y by permitting that output signal to pass through the sample and hold circuit 8 in order to raise the duty ratio and thereafter by allowing it to pass through a low-pass filter having for example a frequency band of 3 MHz. In addition, the output of the sample and hold circuit 8 is input to the false color signal suppression circuit 21. As shown in FIG. 7, the false color signal suppression circuit comprises of, e.g., a low-pass filter 21a, a high brightness detector 21b as detection means, and variable gain amplifier 21c as level control means. The output signal passed through the sample and hold circuit 8 is input to the low-pass filter 21a, where the high-frequency domain noise is eliminated. Thereafter this signal is compared with a predetermined saturation level by the high brightness detector 21b to detect whether it has high brightness or not and this detection signal is used as a control signal for the variable gain amplifier 21c. When the brightness level reaches the saturation level, the gain of the amplifier 21c drops, thereby controlling the amplitude of the signal so that it becomes small and at the same time enabling the occurrence of the false color signal to be suppressed. In addition, since the threshold level in detection of high brightness can be set to a proper value, as the output signal of the CCD approaches its saturation, it is also possible to gradually reduce concentration of color little by little. The output signal whose amplitude was controlled by the false color signal suppressor 21 is input to the three sample and hold circuits 9, 10 and 11, respectively. These sample and hold circuits 9, 10 and 11 are turned on by the sampling pulses to be supplied from the driver 6, respectively; these pulses have a phase difference of 120° from each other. Therefore, substantially synchronized continuous signals relating to R, G and Cy are obtained from the sample and hold circuits 9–11, respectively. These signals pass through the lowpass filters each having a frequency bandwidth of about 500 KHz to produce the R, G and Cy signals, respectively. The B signal is derived from the difference between these output signals Cy and G. As already mentioned previously, the transmission factor of the color filter has been selected in the manner such that the outputs of the cells of the CCD 5 corresponding to R, G and Cy of the color filter 4 become 1:1:1 at a reference color temperature and that both G and B in Cy become 1:1; therefore, the B signal is obtained by the calculation of 2Cy - G=B. The luminance signal Y and color signals R, G and B thus obtained are introduced to the matrix circuit 17 through the processors 16a–16d. The color-difference signals R-Y and B-Y synthesized by the matrix circuit are switched over at every lH (horizontal interval) by the switching circuit 18 as sequence means according to the present invention to produde the line-sequence signal of R-Y, B-Y, R-Y, and B-Y and this line-sequence signal is input to a magnetic recording circuit 19. The luminance signal Y is also input to the magnetic recording circuit 19 through the matrix circuit. A predetermined signal processing is performed in the magnetic recording circuit and the image signal is recorded with a predetermined format in a recording medium such as a magnetic sheet and the like by the head 20.

Each color-difference signal to be linesequentially sent and the luminance signal are frequency modulated by different carrier frequencies by the magnetic recording circuit 19, respectively. For example, (R-Y) is frequency modulated by the carrier frequency of 1.2 MHz, (B-Y) is modulated by 1.3 MHz, and Y is modulated by 8 MHz.

Figure 8:
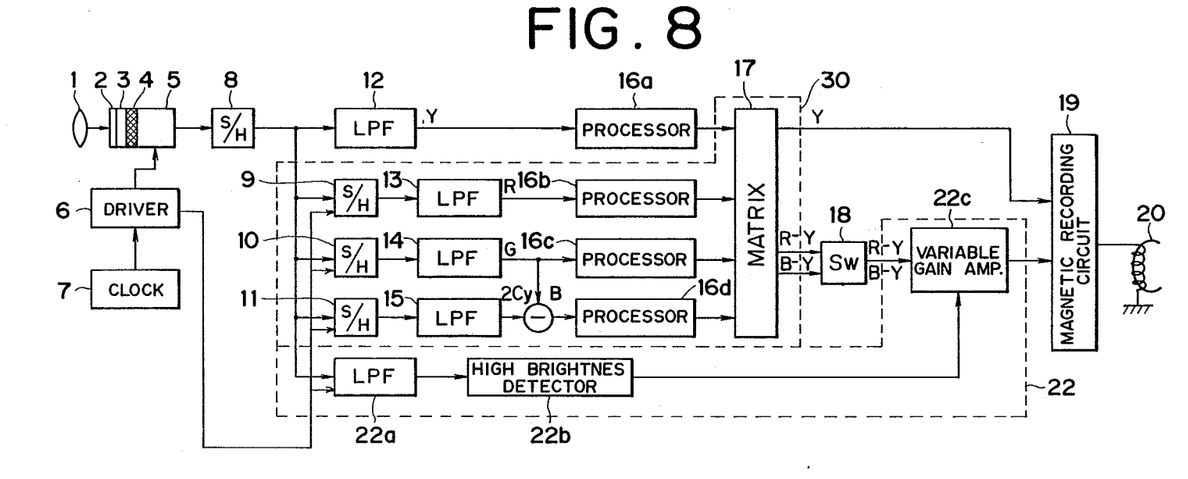
FIG. 8 is a block diagram of another embodiment of the present invention.

Moreover, in case of the system constituted as shown in FIG. 7, it is possible to construct the system in a manner such that the variable gain amplifier for controlling the color signal is provided after the switching circuit 18 instead of after the sample and hold circuit 8, thereby suppressing the output from the switching circuit 18, at the stage of the linesequence signal of R-Y and B-Y. FIG. 8 is a diagram showing a second embodiment of the present invention constituted in such a manner as mentioned above. In the diagram, a reference numeral 22 denotes a false color signal suppression circuit, in which the output of the sample and hold circuit 8 is input to a high brightness detector 22b through a low-pass filter 22a. The high brightness detector 22b compares the level of the input signal with a reference level to obtain a comparison output and this output is input as a control signal to a variable gain amplifier 22c. The variable gain amplifier 22c is connected to the output of the switching circuit 18, thereby suppressing the level of the line-sequence signal of (R-Y) and (B-Y).

In case of this second embodiment, although there is a possibility such that a width of the false color signal could be widened by the low-pass filter in the process for color separation, since the level is suppressed after once performing the conversion of color-difference line-sequence instead of suppressing the color-difference signals of (R-Y) and (B-Y) by amplifiers and the like, respectively, there is a feature such that the hues are accurately maintained without causing variation.

That is to say, when each color-difference signal is suppressed respectively, there is a possibility of occurrence of error in the levels of both color-drfference signals due to variation of the characteristics of the amplifiers and if such an error occurs, this causes a problem such that the vector phases in the chromaticity coordinates will change. However, according to the present embodiment, such a problem will not occur since the suppression of the color signals is line-sequentially performed. The necessity of only one amplifier, of course, contributes to simplification of the system configuration.

In addition, in the system whereby the color-difference line-sequence signal is frequency modulated as in the present embodiment, it is not possible to suppress the color signal in the same manner as conventional technology wherein a color signal amplitude modulated by an encoder is, suppressed by, for example, a variable gain amplifier. However, by performing the suppression in the line-sequenced state before the frequency modulation as in the present embodiment, it is possible to prevent the moire at the high brightness without causing drop-out.

Figure 9:
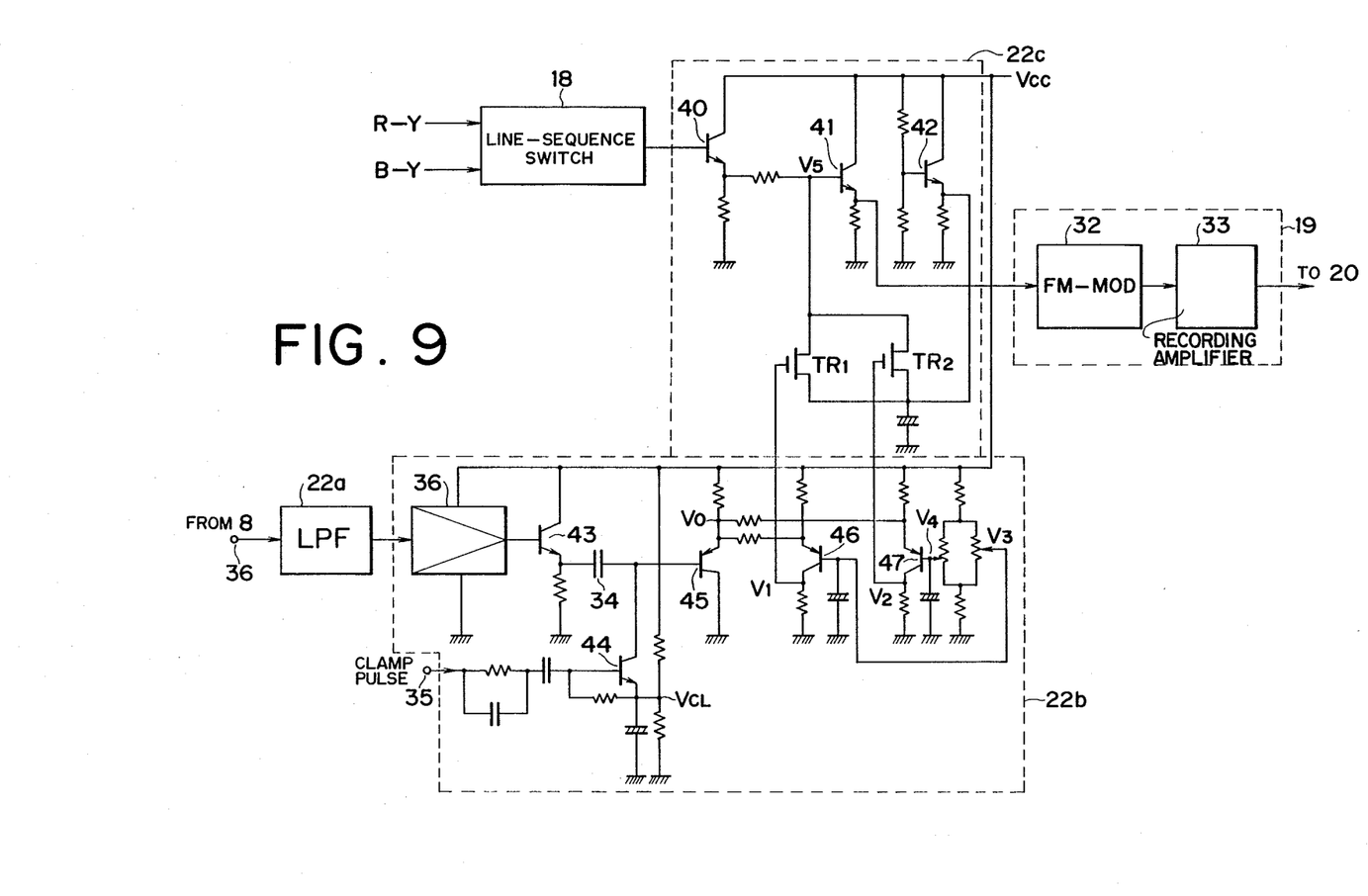
FIG. 9 is a diagram showing an example of a practical circuit arrangement of a main part of the block diagram shown in FIG. 8.

Reference now to FIG. 9, there is shown a diagram illustrating an example of a practical circuit of a principal part of the constitution shown in FIG. 8, in which the same parts and elements as those shown in FIG. 8 are designated by the same reference numerals. In FIG. 9, reference numerals 40–47 and $TR_1$ and $TR_2$ denote transistors; 34 indicates a clamping capacitor; 35 is a clamping pulse input terminal; 36 is an amplifier; and 32 is a frequency modulator.

After the high-frequency domain noise of the dot-sequence signal through the sample and hold circuit 8 is eliminated by the low-pass filter 22a, this signal is amplified by the amplifier 36. An output of the amplifier 36 is conducted from the emitter of the transistor 43 constituting a high input impedance circuit and is clamped by the clamping capacitor 34. Namely, the clamping pulse is input from the clamping pulse input terminal 35 at the interval responsive to the optical black in the horizontal blanking interval and this pulse turns on the transistor 44, thereby causing the capacitor 34 to be charged or discharged so as to be at constant potential $V_{CL}$.

Consequently, a video signal of which the DC level was accurately reproduced is input, to the base of the transistor 45, so that the emitter potential $V_0$ changes.

On the other hand, the transistors 46 and 47 are biased at their base by constant potentials $V_3$ and $V_4$, respectively, and are set so as to meet the relationship of $V_4 \geq V_3$.

Thus, while $V_0$ is smaller than $V_3$, the transistor 46 is OFF and its collector potential $V_1$ is at a low level and the transistor $TR_1$ is OFF. In addition, the transistor $TR_2$ is also OFF since $V_4 > V_0$ at this interval.

When $V_3 < V_0 < V_4$, the transistor 46 is ON, while the transistor 47 is OFF, so that the transistor $TR_1$ is ON, but $TR_2$ is OFF. In this case, the impedance between source-drain of the transistor $TR_1$ decreases with an increase in the level of $V_1$ and the potential $V_5$ is continuously suppressed as shown by a characteristic curve of FIG. 10.

Figure 10:
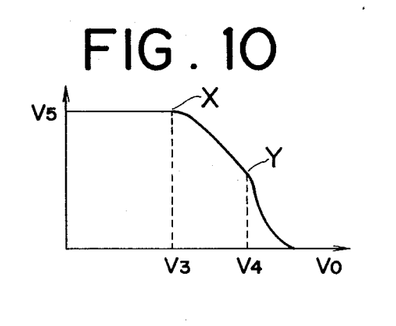
FIG. 10 is a diagram showing a characteristic curve relating to the potentials $V_0$ and $V_5$ in FIG. 9.

Furthermore, in case of $V_4 < V_0$, both transistors 46 and 47 are ON and the transistors $TR_1$ and $TR_2$ are also ON, so that the synthesized impedance of $TR_1$ and $TR_2$ decreases in accordance with an increase in the levels of $V_1$ and $V_2$, causing the potential $V_5$ to be further suppressed as represented by the graph of FIG. 10. This potential $V_5$ is modulated by the frequency modulator 32 through the transistor 41 to form an emitter follower and thereafter it is amplified by recording amplifier 33 and is introduced to the head 20.

As described above, according to the present embodiment, no false color signal is produced since the color-difference line-sequence signal is suppressed at the high brightness. Furthermore, in this embodiment, no drop-out will occur since this suppression is done before modulation. In addition, since reference potentials of two stages are provided upon the discrimination of the brightness levels, and the degree of suppression is increased step by step, the color signal is continuously suppressed step by step in accordance with a change in the brightness level of a video signal and, accordingly, incongruity in the signal will not be caused.

Although a stripe color filter of R, G and Cy has been used in the above-described embodiments, a mosaic filter may be used and in particular, a filter constitution and combination of colors are not limited to those in the embodiments. The present invention can be applied to a system using MOS X-Y address type devices or other solid-state image pickup devices as well as CCD image pickup device.

As described above, according to the present invention, the brightness level responsive to the saturation level of the image pickup means is detected and a gain control signal for the variable gain amplifier is produced from this detection output, and the amplitude of the dot-sequence signal of the image pickup means or the amplitude of the color-difference line-sequence signal is suppressed; therefore, it is possible to accurately suppress the false color signal with a simple constitution, thereby improving color reproductivity.

In addition, the present invention is particularly effective for use in a system which does not have a process of modulating color subcarrier by permitting a luminance signal and color signals to pass through an NTSC encoder.

Furthermore, since color signal is suppressed dot-sequentially or line-sequentially at the front or rear stage of the color separation circuit to avoid the suppression processings of the levels with respect to each color, each color can be simply preferably balanced.

Additionally, since one signalling channel is provided in certain portions of the device of the invention, suppression can be performed by inserting the suppression circuit in this signalling channel. Therefore, this system is an improvement over cases in which two supression circuits are each inserted in one of two signaling channels occurring in other portions of the device, since this system is simple and does not require charcteristic matching between two suppression circuits.

Moreover, if the level of the dot-sequence signal is controlled before the color separation circuit in particular, many effects are provided, such that the false color signal can be suppressed with an accurate phase and the like.

What is claimed is:

1. An image pickup device comprising:
   (a) a color separation filter;
   (b) image pickup means for converting an optical image passed through said color separation filter into an electrical signal;
   (c) detection means for detecting a brightness level of said optical image;
   (d) color signal forming means for forming a plurality of color signals from an output of said image pickup means;
   (e) sequence means for sequencing said color signals in a predetermined cycle to produce a sequential color signal;
   (f) control means for controlling the level of said sequential color signal in response to an output of said detection means; and
   (g) modulation means for modulating said level-controlled sequential color signal.

2. An image pickup device according to claim 1, wherein said detection means detects the level of a luminance signal component in the output of said image pickup means.

3. An image pickup device according to claim 1, wherein said sequence means includes a switching circuit for switching between said plurality of color signals in a predetermined cycle and for outputting said switched color signals to a common line to produce said sequential color signal.

4. An image pickup device according to claim 3, wherein said color signals are color-difference signals.

5. An image pickup device according to claim 1, wherein said image pickup means produces an output having horizontal intervals and wherein said sequence means sequences said color signals by switching between said plurality of color signals at each of said horizontal intervals and outputting said switched color signals to a common line to produce said sequential color signal.

6. An image pickup device according to claim 5, wherein said color signals are color-difference signals.

7. An image pickup device according to claim 1, wherein said color signals are color-difference signals.

8. An image pickup device according to claim 7, wherein said color-difference signals are (R-Y) and (B-Y).

9. An image pickup device according to claim 1, wherein said control means suppresses the sequential color signal in response to a detection by said detetion means that the brightness level of the optical image exceeds a predetermined level.

10. A image pickup according to claim 1, wherein said detection means compares the brightness level of said optical image with a plurality of reference levels.

11. An image pickup device according to claim 1, wherein said modulation means frequency modulates in accordance with predetermined carrier frequencies the level-controlled sequential color signal.

12. An image pickup device comprising:
    (a) a color separation filter;
    (b) image pickup means for converting an optical image passed through said color separation filter into an electrical signal;
    (c) detection means for detecting a brightness level of said optical image;
    (d) sequence means for forming a line-sequential color-difference signal from an output of said image pickup means;
    (e) control means for controlling the level of said line-sequential color-difference signal in response to an output of said detection means; and
    (f) modulation means for modulating said level-controlled line-sequential color-difference signal.

13. An image pickup device according to claim 12, wherein said detection means detects the level of a luminance signal component in the output of said image pickup means.

14. An image pickup device according to claim 12, wherein said control means suppresses a signal input to said sequence means in response to a detection by said detection means that the brightness level of the optical image exceeds a predetermined level.

15. An image pickup device according to claim 12, wherein said detection means compares the brightness level of said optical image with a plurality of reference levels.

16. A device for processing a plurality of color signals and a luminance signal generated by a generation means, said device comprising:
    (a) detection means for detecting a brightness level of the luminance signal;

(b) sequence means for sequencing the color signals in a predetermined cycle to produce a sequential color signal;
(c) control means for controlling the level of said sequential color signal in response to an output of said detection means; and
(d) modulation means for modulating the level-controlled sequential color signal.

17. A device according to claim 16, wherein said sequence means includes a switching circuit for switching between the plurality of color signals in a predetermined cycle and for outputting said switched color signals to a common line to produce said sequential color signal.

18. A device according to claim 16, wherein said plurality of color signals and said luminance signal generated by said generation means have horizontal intervals, and wherein said sequence means sequences said color signals by switching between the plurality of color signals at each of said horizontal intervals and outputting the switched color signals to a common line to produce said sequential color signal.

19. A device according to claim 16, wherein said color signals are color-difference signals.

20. A device according to claim 19, wherein said color-difference signals are (R-Y) and (B-Y).

21. A device according to claim 16, wherein said control means suppresses the sequential color signal in response to a detection by the detection means that the brightness level of the luminance signal exceeds a predetermined level.

22. A device according to claim 16, wherein said detection means compares the brightness level of said luminance signal with a plurality of reference levels.

23. A device according to claim 16, wherein said modulation means frequency modulates in accordance with predetermined carrier frequencies the level-controlled sequential color signal.

24. A device according to claim 16, further comprising means for processing the color signals and the luminance signal generated by said generation means.

25. A device for processing a video signal having a luminance component and color components, said device comprising:
(a) detection means for detecting when the level of the luminance component of the video signal exceeds a predetermined level;
(b) sequence means for sequencing the color components of the video signal to produce a sequential color signal; and
(c) control means for controlling the level of the sequential color signal such that the level of the sequential color signal is reduced when said detection means detects that the level of the luminance component of the video signal exceeds the predetermined level.

26. A device according to claim 25, further comprising:
modulation means for modulating said level-controlled color signal.

27. A device according to claim 25, further comprising means for generating the video signal.

28. A device according to claim 27, wherein said video signal generating means includes means for converting an optical image passed through a color separation filter into the video signal.

29. A device according to claim 25, wherein said sequence means includes:
means for separating the color components of the video signal into a plurality of color signals on a plurality of lines;
means for processing said plurality of color signals separated by said separating means; and
switch means for sequentially selecting each of said plurality of color signals and supplying the selected color signal to a common line to produce said sequential color signal.

30. A device according to claim 29, wherein said plurality of color signals are color-difference signals.

31. A device according to claim 30, further comprising control means for controlling said switch means.

* * * * *

UNITED STATES PATENT AND TRADEMARK OFFICE
CERTIFICATE OF CORRECTION

PATENT NO. : 4,754,323

DATED : June 28, 1988

INVENTOR(S) : TOSHIO KAJI, ET AL.

It is certified that error appears in the above-identified patent and that said Letters Patent is hereby corrected as shown below:

AT [63] IN RELATED U.S. APPLICATION DATA

"Ser. No. 564,764," should read --Ser. No. 564,576,--.

IN THE DRAWINGS

Sheet 1, Figure 2, "700 (mm)" should read --700 (nm)--.
Sheet 2, Figure 4, "700 (mm)" should read --700 (nm)--.
Sheet 4, Figure 8,
"HIGH BRIGHTNES" should read --HIGH BRIGHTNESS--.
    DETECTOR                              DETECTOR

COLUMN 1

Line 22, "solidstate" should read --solid-state--.

COLUMN 2

Line 1, "apparatua" should read --apparatus--.
Line 46, "linesequence" should read --line-sequence--.
Line 56, "in" should read --an--.

COLUMN 3

Line 25, "BRIEF" should read --DETAILED--.
Line 47, "suppresslon" should read --suppression--.
Line 50, "B," should read --R,--.
Line 63, "abovementioned" should read --above-mentioned--.

UNITED STATES PATENT AND TRADEMARK OFFICE
CERTIFICATE OF CORRECTION

PATENT NO. : 4,754,323
DATED : June 28, 1988
INVENTOR(S) : TOSHIO KAJI, ET AL.

It is certified that error appears in the above-identified patent and that said Letters Patent is hereby corrected as shown below:

COLUMN 4

Line 8, "array" should read --arrays--.
Line 23, "highfrequency" should read --high-frequency--.
Line 32, "comprises of," should read --comprises,--.
Line 33, "variable" should read --a variable--.
Line 60, "lowpass" should read --low-pass--.

COLUMN 5

Line 9, "produde" should read --produce--.
Line 18, "linesequentially" should read --line-sequentially--.
Line 31, "linesequence" should read --line-sequence--.

COLUMN 6

Line 4, "is," should read --is--.
Line 10, "Reference" should read --Referring--.
Line 32, "input," should read --input--.
Line 37, "$V_4 \geq V_3.$" should read --$V_4 > V_3.$--.

COLUMN 7

Line 10, "device." should read --devices.--.
Line 36, "signaling" should read --signalling--.

UNITED STATES PATENT AND TRADEMARK OFFICE
CERTIFICATE OF CORRECTION

PATENT NO. : 4,754,323
DATED : June 28, 1988
INVENTOR(S) : TOSHIO KAJI, ET AL.

It is certified that error appears in the above-identified patent and that said Letters Patent is hereby corrected as shown below:

COLUMN 8

Line 26, "detetion" should read --detection--.
Line 29, "A image pickup" should read --An image pickup device--.
Line 33, "frequency modulates" should read --frequency-modulates--.

COLUMN 9

Line 36, "frequency modulates" should read --frequency-modulates--.

Signed and Sealed this

Fourth Day of July, 1989

Attest:

DONALD J. QUIGG

Attesting Officer

Commissioner of Patents and Trademarks